United States Patent
Zhang et al.

(10) Patent No.: US 9,802,489 B2
(45) Date of Patent: Oct. 31, 2017

(54) SYSTEM AND METHOD FOR CONTROLLING VEHICLE ELECTRIC POWER AND VEHICLE COMPRISING THE SYSTEM

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Yongzeng Zhang, Guangdong (CN); Xiaowen Du, Guangdong (CN); Yilin Zhong, Guangdong (CN); Chunfen Wu, Guangdong (CN)

(73) Assignees: BYD Company Limited, Shenzhen, Guangdong (CN); Shenzhen BYD Auto R&D Company Limited, Shenzhen, Guangdong (CN)

( * ) Notice: Subject to any disclaimer, the term of this patent is extended or adjusted under 35 U.S.C. 154(b) by 288 days.

(21) Appl. No.: 14/228,719

(22) Filed: Mar. 28, 2014

(65) Prior Publication Data
US 2014/0292073 A1      Oct. 2, 2014

(30) Foreign Application Priority Data

Mar. 28, 2013   (CN) .......................... 2013 1 0105930

(51) Int. Cl.
*B60L 1/00*      (2006.01)
*B60R 16/03*    (2006.01)

(52) U.S. Cl.
CPC ................ *B60L 1/00* (2013.01); *B60R 16/03* (2013.01)

(58) Field of Classification Search
None
See application file for complete search history.

(56) References Cited

U.S. PATENT DOCUMENTS

2012/0262106 A1*  10/2012  Omiya .................... B60R 16/03
                                                                320/104

FOREIGN PATENT DOCUMENTS

| JP | 2001-204137 A |   | 7/2001 |
|----|---------------|---|--------|
| JP | 2001204137 A  | * | 7/2001 |
| TW | 201024121 A   |   | 7/2010 |
| TW | 201121220 A   |   | 6/2011 |
| TW | 201139175 A   |   | 11/2011 |

* cited by examiner

*Primary Examiner* — Rexford Barnie
*Assistant Examiner* — Swarna N Chowdhuri
(74) *Attorney, Agent, or Firm* — Finnegan, Henderson, Farabow, Garrett & Dunner, LLP

(57) ABSTRACT

A method and a system for controlling vehicle electric power, and a vehicle comprising the same, are provided. The method includes converting a first voltage supplied by at least one of a startup generator and a storage battery of the vehicle into a second voltage, and controlling the at least one of the startup generator and the storage battery to supply power to a first device with the first voltage, and to supply power to a second device with the second voltage. The system includes a startup generator and a storage battery, configured to supply a first voltage, and a converter configured to convert the first voltage into a second voltage. At least one of the startup generator and the storage battery is configured to supply power to a first device with the first voltage, and to supply power to a second device with the second voltage.

16 Claims, 7 Drawing Sheets

SYSTEM AND METHOD FOR CONTROLLING VEHICLE ELECTRIC POWER AND VEHICLE COMPRISING THE SYSTEM

CROSS-REFERENCE TO RELATED APPLICATION

This application claims priority to and benefits of Chinese Patent Application Serial No. 201310105930.9, filed with the State Intellectual Property Office of China on Mar. 28, 2013. The entire content of the above-referenced application is incorporated herein by reference.

FIELD

The present disclosure generally relates to the field of vehicle power management, and more particularly to a method and a system for management of vehicle power, and to a vehicle comprising the system for power management.

BACKGROUND

With the proliferation of electronic or electric devices, each operating on a variety of voltage supplies and currents, used or integrated in a vehicle, the electric load of the vehicle becomes larger. A complicated electric power system of the vehicle is also needed to accommodate these devices. This results in a power supply system of low efficiency. Besides, it can be difficult to further improve the fuel efficiency and to reduce waste of energy for a conventional vehicle with, for example, a single 12 V electric system, which can lead to poor performance and high energy loss to accommodate these devices. In addition, as more of these devices are connected to the electric power system of the vehicle, hidden danger of fault increases, which reduces the reliability of the electric power system. Therefore, there is a need for a power management system to co-ordinate the operation of the electric power supply to these devices, to improve the reliability and efficiency of the electric power supply.

SUMMARY

The present disclosure provides a system and a method to co-ordinate the operation of an electric power supply to one or more devices, in which the system may cause some devices to stop receiving power when a motor fails to turn off or when the electric quantity of a battery drops below a certain level.

According to an embodiment of the present disclosure, a method for controlling an electric power supply includes converting a first voltage supplied by at least one of a startup generator and a storage battery of the vehicle into a second voltage, and controlling the at least one of the startup generator and the storage battery to supply power to a first device with the first voltage, and to supply power to a second device with the second voltage.

According to an embodiment of the present disclosure, the first voltage is larger than the second voltage. In some embodiments, controlling the storage battery is performed via a communication network.

According to an embodiment of the present disclosure, the method further includes monitoring a state of a motor, and if detecting the motor to be off, controlling the storage battery to supply power to the second device with the second voltage, and controlling the at least one of the startup generator and the storage battery to stop supplying power to the first device with the first voltage. In some embodiments, the method further includes monitoring an electric quantity of the storage battery, and, if detecting the electric quantity to be less than a first predetermined electric quantity threshold, determining to turn on the motor. In some embodiments, the method further includes if detecting the motor to be turned on after at least one attempt to turn it on, stopping supplying power to the second device with the second voltage. In some embodiments, the method further includes if detecting the motor to be off after at least one attempt to turn it on, and if detecting the electric quantity to be less than a second predetermined electric quantity threshold, stopping supplying power to the second device with the second voltage. In some embodiments, the second predetermined electric quantity threshold is at a value less than the first predetermined electric quantity threshold.

According to an embodiment of the present disclosure, a system for controlling an electric power supply, includes a startup generator and a storage battery, configured to supply a first voltage, and a converter configured to convert the first voltage into a second voltage. At least one of the startup generator and the storage battery is configured to supply power to a first device with the first voltage, and to supply power to a second device with the second voltage.

In some embodiments of the system according to the present disclosure, the first voltage is at a voltage level larger than the second voltage. In some embodiments, the system further comprises a communication network. The storage battery is configured via the communication network. In some embodiments, the communication network comprises at least a power network, a comfort network and a startup network. The power network, the comfort network, and the startup network communicate via a gateway.

In some embodiments of the system according to the present disclosure, the storage battery is configured to supply power to the second device with the second voltage and the at least one of the startup generator and the storage battery is configured to stop supplying power to the first device with the first device, if a motor is detected to be off. In some embodiments, the motor is turned on, if an electric quantity of the storage battery is detected to be less than a first predetermined electric quantity threshold and if the motor is detected to be off. In some embodiments, the second device is stopped to be supplied with power, if the motor is detected to be on after at least one attempt to turn it on. In some embodiments, the second device is stopped to be supplied with power, if the motor is detected to be off after at least one attempt to turn it on and if the electric quantity is detected to be less than a second predetermined electric quantity threshold. In some embodiments, the second predetermined electric quantity threshold is at a value less than the first predetermined electric quantity threshold.

According to an embodiment of the present disclosure, a vehicle comprises: a motor, a startup generator and a storage battery, configured to supply a first voltage, and a converter configured to convert the first voltage into a second voltage. At least one of the startup generator and the storage battery is configured to supply power to a first device with the first voltage, and to supply power to a second device with the second voltage.

In some embodiments of a vehicle according to the present disclosure, the vehicle further comprises a communication network. The storage battery may be configured via the communication network.

In some embodiments of a vehicle according to the present disclosure, the storage battery is configured to supply power to the second device with the second voltage and the at least one of the startup generator and the storage battery is configured to stop supplying power to the first device with the first voltage, if the motor is detected to be off; the motor is turned on, if an electric quantity of the storage battery is detected to be less than a first predetermined electric quantity threshold and if the motor is detected to be off; the second device is stopped to be supplied with power, if the motor is detected to be on after at least one attempt to turn it on; and the second device is stopped to be supplied with power, if the motor is detected to be off after at least one attempt to turn it on and if the electric quantity is detected to be less than a second predetermined electric quantity threshold.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
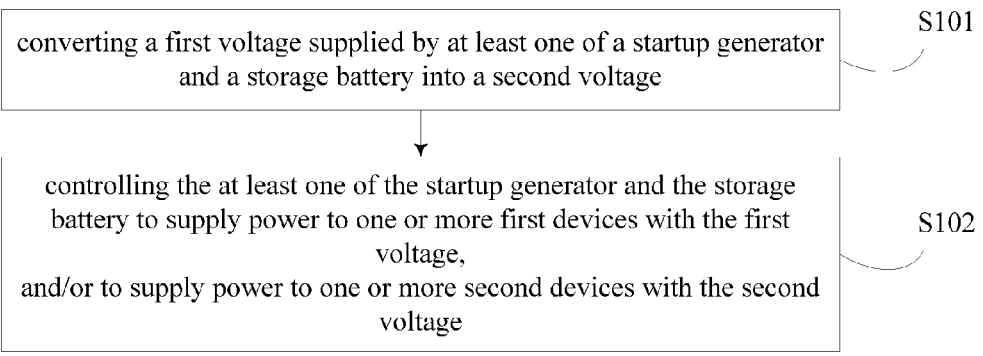
FIG. 1 is a flow chart illustrating an exemplary method of controlling an electric power supply to various devices, according to one embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

Figure 2:
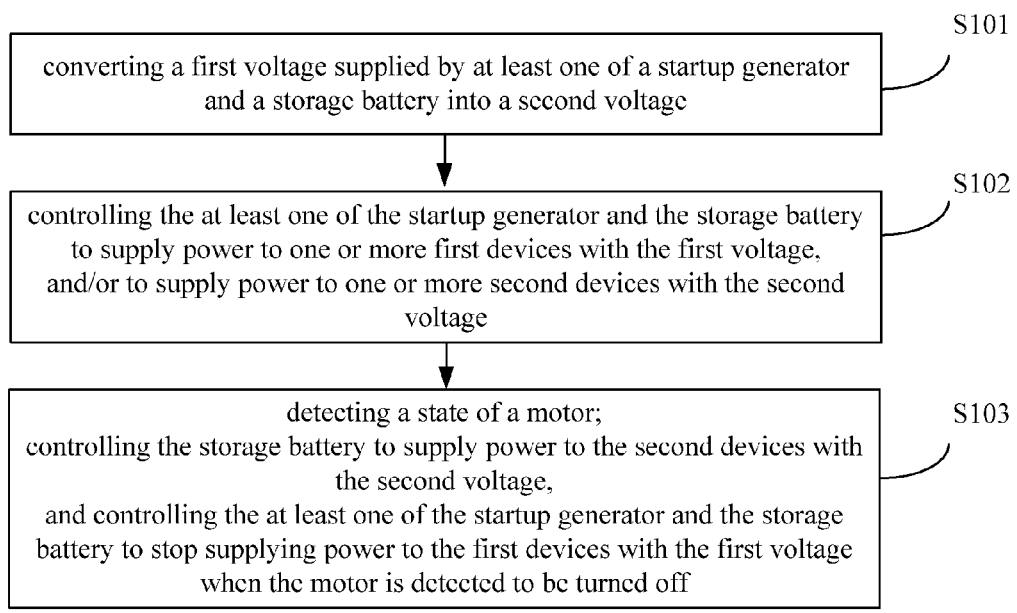
FIG. 2 is a flow chart illustrating an exemplary method of controlling an electric power supply to various devices, according to one embodiment of the present disclosure.
Figure 3:
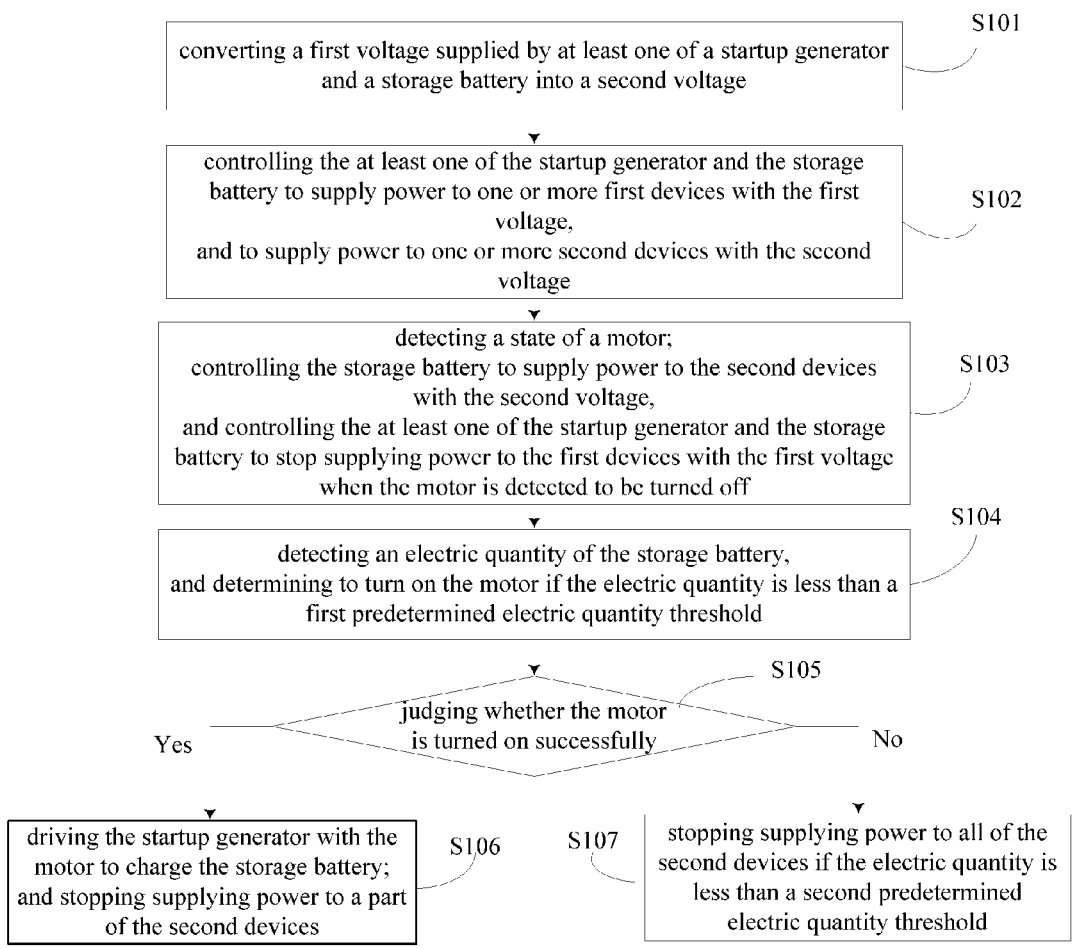
FIG. 3 is a flow chart illustrating an exemplary method of controlling an electric power supply to various devices, according to one embodiment of the present disclosure.

An exemplary method for controlling an electric power supply to various devices will be described below in detail with reference to FIGS. 1-3.

FIG. 1 is a flow chart illustrating an exemplary method of controlling an electric power supply to various devices, according to embodiments of the present disclosure. The method comprises following steps.

At step S101, a first voltage supplied by at least one of a startup generator and a storage battery of, for example, a vehicle, is converted into a second voltage. In some embodiments, one or more DC (Direct Current) converters can be used to convert the first voltage into the second voltage. In some embodiments, the DC converters further comprise a high power DC converter and a low power DC converter. In some embodiments, the startup generator and the storage battery combine to output the first voltage. In some embodiments, either the startup generator, or the storage battery, outputs the first voltage. In some embodiments, the second voltage may be less than the first voltage. In some embodiments, the first voltage is substantially at 48 V. In some embodiments, the second voltage is substantially at 12 V. For convenience, the first voltage may be referred to be at 48 V and the second voltage may be referred to be at 12 V in the rest of the disclosure, although a person with ordinary skill in the art will understand that these voltage levels are exemplary only, and the embodiments may be operated when using other voltage conditions.

At step S102, at least one of the startup generator and the storage battery is controlled to supply electric power to one or more first devices with the first voltage, and/or to supply power to a second device with the second voltage. In some embodiments, some or all of the first and second devices are part of the vehicle.

In some embodiments, at least one of the startup generator and the storage battery is controlled to supply power to the first devices with the first voltage. In some embodiments, the first devices are supplied with a first voltage of 48 V and include but are not limited to vehicle components, such as a blower control module, a condenser fan control module, a cooling fan control module, an electric power steering electronic control unit (EPS ECU), a starter control module, a window lifting motor, an exterior mirror motor, a wiper motor, a seat motor and a pump motor. In some embodiments, the DC converters are also supplied with the first voltage at 48 V.

In some embodiments, the second voltage obtained at step S101 is supplied to the second devices. In some embodiments, the second devices are supplied with the second voltage of 12 V and include but are not limited to vehicle components, such as a BCM (body control module), an I-Key (intelligence key), a seat ECU (electronic control unit), a gateway, an ECM (engine control module), and an air condition ECU.

With such an arrangement, an electric power system of a vehicle can be controlled to operate under a dual-voltage mode. This can simplify the configuration of the electric power system of the vehicle, while increasing the efficiency of the electric system and improving fuel efficiency. In some embodiments, by adopting a dual-voltage of 48 V and 12 V, the configuration of the electric power system can be further simplified, and the reliability and efficiency of the electric system can be further improved.

In some embodiments, the state of a motor of, for example, a vehicle, can be detected in real time when the first device and the second device are supplied with the first voltage and the second voltage respectively. FIG. 2 is a flow chart illustrating an exemplary method of controlling an electric power supply to various devices, according to embodiments of the present disclosure, which comprises additional steps as shown in FIG. 1 as follows.

At step S103, the state of the motor is detected. When the motor is detected to be turned off, the storage battery is controlled to supply power to the second devices with the second voltage, and at least one of the startup generator and the storage battery is controlled to stop supplying power to the first devices with the first voltage FIG. 3 is a flow chart illustrating an exemplary method of controlling an electric power supply to various devices, according to embodiments of the present disclosure, which comprises additional steps following step S103 in FIG. 2 as follows.

At step S104, where the motor is detected to be off, an electric quantity of the storage battery is detected, and it is determined to turn on the motor if the electric quantity of the storage battery is detected to be less than a first predetermined electric quantity threshold. In some embodiments, the electric quantity of the storage battery is detected in real time while the motor is detected to be off, and it is determined to turn on the motor if the electric quantity of the storage battery is detected to be less than the first predetermined electric quantity threshold.

At step S105, it is judged whether the motor is turned on successfully. If the motor is turned on, step S106 will be executed. If the motor fails to be turned on, step S107 will be executed.

At step S106, the startup generator is driven by the motor to charge the storage battery, and a part of the second devices stop receiving power. In some embodiments, when the motor is turned on, the startup generator is driven by the motor to charge up the storage battery. In some embodiments, when the motor is turned on, the storage battery stops outputting energy to the high power DC converter. The second devices that receive power from the high power DC converter thus stop receiving power. In some embodiments, the second devices that receive power from the high power DC converter may include but not limited to the gateway and the seat ECU. In some embodiments, the low power DC converter continues to receive power and provide power to some other second devices. In some embodiments, the second devices that receive power from the low power DC converter include but not limited to the I-Key and the BCM. With such an arrangement, the electric power supply can be switched to a low power consumption mode to conserve electric energy.

At step S107, where the motor is judged to remain off after prior attempt to turn it on fails, the electric quantity of the storage battery is again detected. If the electric quantity is detected to be less than a second predetermined electric quantity threshold, all of the second devices stop receiving power. In some embodiments, the second predetermined electric quantity threshold is less than the first predetermined electric quantity threshold. In some embodiments, the second predetermined electric quantity threshold is set at a value to provide a normal start for a vehicle. In some embodiments, if the motor is detected to be off and the electric quantity of the storage battery is detected to be less than the second predetermined electric quantity threshold, in order to provide a normal start for the vehicle, the storage battery is controlled to stop outputting energy. In some embodiments, both the high power DC converter and the low power DC converter stop receiving power and stop supplying power to all of the second devices. With such an arrangement, the electric power supply can be switched to a super-low power consumption mode to further conserve electric energy. In some embodiments, the super-low power consumption mode can be exited to, for example, allow a vehicle to be operated in a normal state. In some embodiments, the super-low power consumption mode can be exited by flipping a switch on, for example, a door of the vehicle, so that the storage battery is controlled to resume outputting energy, which allows the vehicle to be operated in a normal state.

In some embodiments, the first devices and the second devices can communicate via LIN (local interconnect network) and/or CAN (controller area network). The CAN comprises a power network, a comfort network and a startup network. The networks can communicate via the gateway, one of the second devices described above.

With the method for controlling the electric power supply according to embodiments of the present disclosure, a first voltage is supplied to one or more first device, and a second voltage is supplied to one or more second devices. Such an arrangement can simplify the configuration of the electric power system of, for example, a vehicle. Such an arrangement can also improve the reliability and efficiency of the electric power system, and increase fuel efficiency and reduce waste of energy, for a vehicle which uses the method described to manage electric power. Moreover, when a motor of, for example, a vehicle, is detected to be turned off, all of the first devices stop receiving the first voltage. If the motor remains off, an electric quantity of the storage battery is detected, and if the electric quantity is detected to be less than a second predetermined electric quantity threshold, all of the second devices stop receiving the second voltage. Such an arrangement can reduce energy loss and conserve energy.

An exemplary system for controlling an electric power supply to various devices will be described below in detail with reference to FIGS. 4-7.

Figure 4:
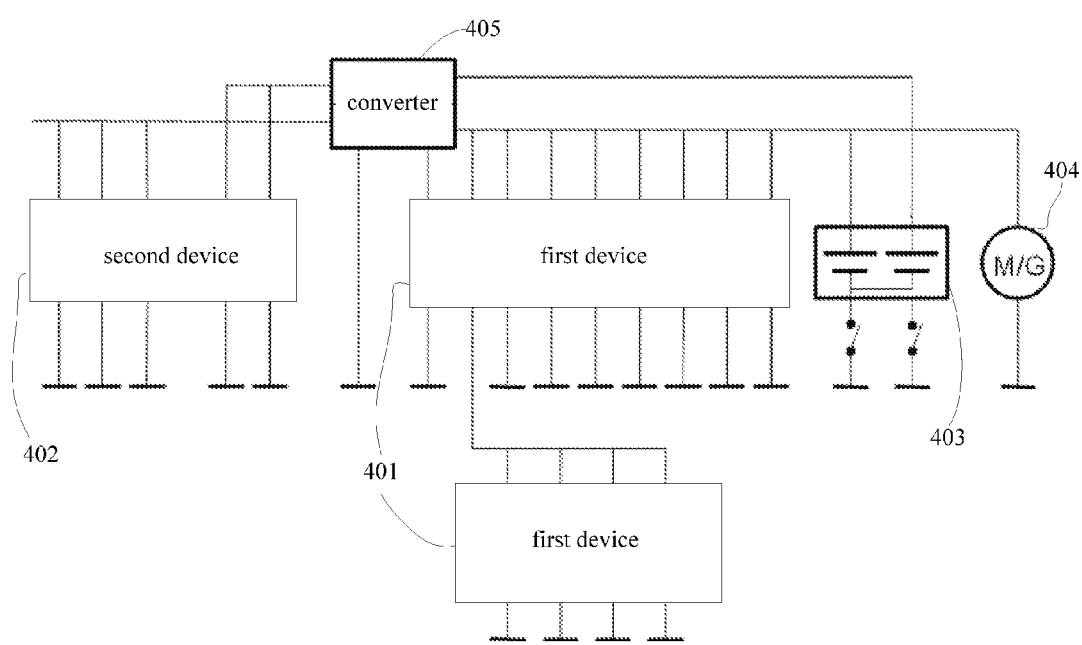
FIG. 4 illustrates an exemplary system for controlling an electric power supply to various devices, according to one embodiment of the present disclosure.

FIG. 4 illustrates an exemplary system for controlling an electric power supply to various devices, according to some embodiments of the present disclosure. As shown in FIG. 4, the system comprises: one or more first devices 401, one or more second devices 402, a storage battery 403, a startup generator 404, and a converter 405. In some embodiments, the storage battery 403 and/or the startup generator 404 are configured to supply a first voltage. In some embodiments, the system in FIG. 4 is used in a vehicle. When starting the vehicle, storage battery 403 can supply voltage to startup generator 404. After the vehicle starts, startup generator 404 can in turn charge the storage battery 403. In some embodiments, either storage battery 403 or the startup generator 404 is controllable to supply power to first devices 401 and/or second devices 402. In some embodiments, both storage battery 403 and the startup generator 404 are controllable to supply power to first devices 401 and the second devices 402. In some embodiments, converter 405 is controllable to convert the first voltage into a second voltage. In some embodiments, the second voltage is less than the first voltage. In some embodiments, the first voltage is substantially at 48 V and the second voltage is substantially at 12 V. In some embodiments, at least one of startup generator 404 and storage battery 403 is controllable to supply power to first devices 401 with the first voltage, and/or to supply power to second devices 402 with the second voltage.

Figure 5:
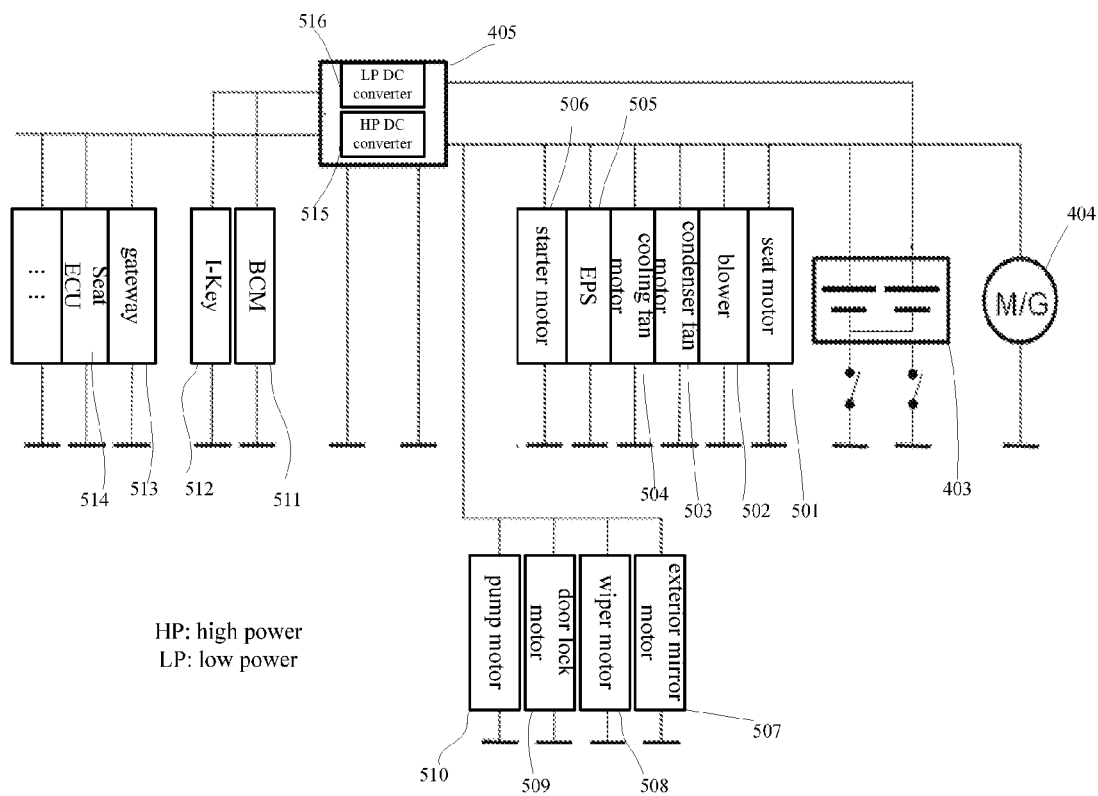
FIG. 5 illustrates an exemplary system for controlling an electric power supply to various devices, according to one embodiment of the present disclosure.

FIG. 5 illustrates an exemplary system for controlling an electric power supply to various devices, with additional components added to the system in FIG. 4, according to some embodiments of the present disclosure. In some embodiments, first devices 401 to be supplied with the first voltage by at least one of storage battery 403 and startup generator 404 include but are not limited to: a seat motor 501, a blower 502, a condenser fan motor 503, a cooling fan motor 504, an EPS (electric power steering) 505, a starter motor 506, an exterior mirror motor 507, a wiper motor 508, a door lock motor 509 and a pump motor 510. In some embodiments, converters 405 comprise a high power DC converter 515 and a low power DC converter 516, both of which are supplied with the first voltage by at least one of storage battery 403 and startup generator 404. In some embodiments, startup generator 404 and storage battery 403 are controllable to output the first voltage, and the first voltage output from at least one of startup generator 404 and the storage battery 403 can be converted into the second voltage by the converter 405. In some embodiments, the second voltage converted by the converters 405 can be supplied to second devices 402. In some embodiments, second devices 402 include but are not limited to a BCM (body control module) 511, an I-Key (intelligence key) 512, a gateway 513, and a seat ECU (electronic control unit) 514. In some embodiments, the first voltage is substantially at 48 V and the second voltage is substantially at 12 V.

In some embodiments, a state of a motor which drives startup generator 404 (not shown in FIGS. 4-7) can be detected in real time. Such a motor can be part of a vehicle and is coupled with the startup generator. When the motor is detected to be turned off, storage battery 403 can be controlled to supply power to second devices 402 with the second voltage, and at least one of the startup generator 404 and the storage battery 403 can be controlled to stop supplying power to first devices 401 with the first voltage at, for example, 48 V, to conserve electric energy.

In some embodiments, an electric quantity of the storage battery 403 can be detected. If the electric quantity of the storage battery 403 is detected to be less than a first predetermined electric quantity threshold, the motor can be turned on. Once the motor is turned on successfully, startup generator 404 can be driven by the motor to charge storage battery 403, and a part of the second devices 402 can stop receiving power. In some embodiments, when the motor is turned on successfully, startup generator 404 can be driven by the motor to charge the storage battery 403. With the motor judged to be turned on, the storage battery 403 can be controlled to stop outputting energy to high power DC converter 515, which can then stop supplying power to a part of the second devices 402 connected to high power DC converter 515, such as gateway 513 and seat ECU 514. In some embodiments, only low power DC converter 516 supplies power to other second devices 402 such as I-Key 512 and BCM 511. With such an arrangement, the electric power system, and/or the vehicle which comprises such a power system, can switch to a low power consumption mode to conserve electric energy.

In some embodiments, if the motor that is coupled with generator 404 is detected to remain off after prior attempt to turn it on, and the electric quantity of the storage battery 403 is detected to be less than a second predetermined electric quantity threshold, all of the second devices 402 can be stop from receiving power. In some embodiments, the second predetermined electric quantity threshold is less than the first predetermined electric quantity threshold. In some embodiments, the second predetermined electric quantity threshold is set at a value to provide a normal start for a vehicle. In some embodiments, if the electric quantity of the storage battery 403 is detected to be less than the second predetermined electric quantity threshold, in order to ensure the normal start for the vehicle, storage battery 403 can be controlled to stop outputting energy. Both the high power DC converter 515 and the low power DC converter 516 can stop supplying power to all of second devices 402. With such an arrangement, the electric power system, and/or the vehicle which comprises such a power system, can switch to a super-low power consumption mode to further conserve electric energy.

Figure 6:
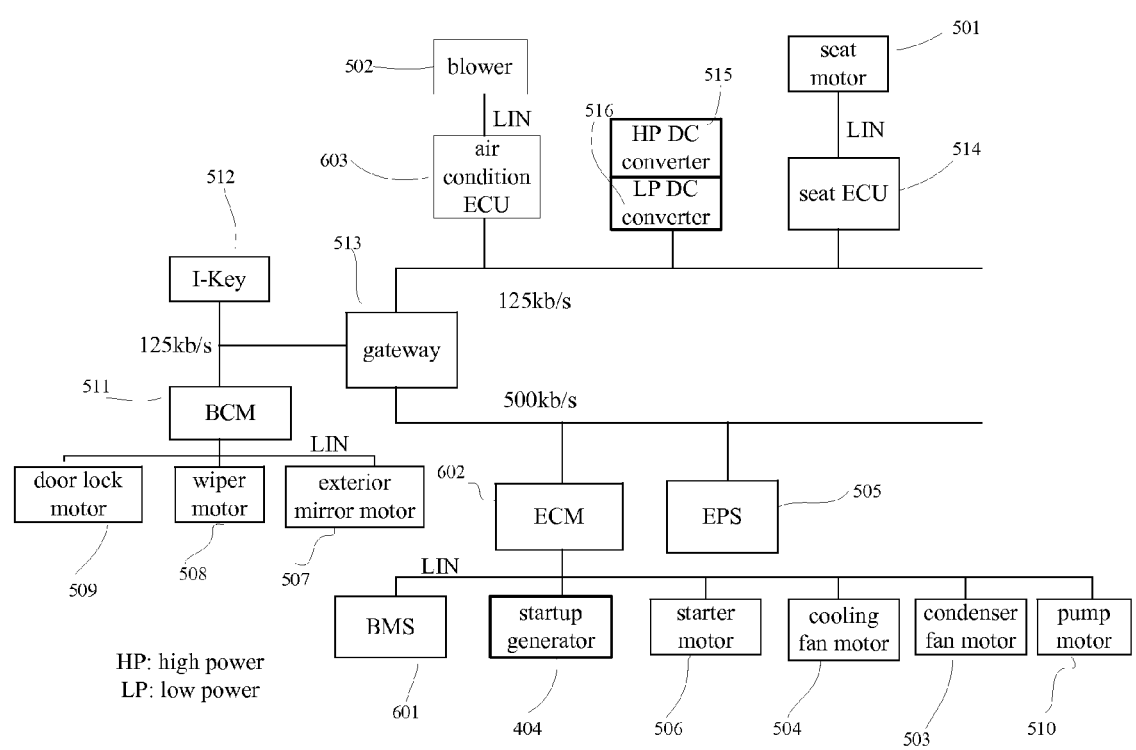
FIG. 6 illustrates an exemplary communication network for communication between various devices, according to one embodiment of the present disclosure.

In some embodiments, some of first devices 401 and some of second devices 402 can communicate via a LIN (local interconnect network) and/or via a CAN (controller area network). In some embodiments, the CAN comprises a power network, a comfort network and a startup network, and the networks communicate via a gateway. FIG. 6 illustrates an exemplary communication network for communication between various devices, according to some embodiments of the present disclosure. In some embodiments, a BMS (battery management system) 601, a starter motor 506, cooling fan motor 504, condenser fan motor 503, pump motor 510 and an ECM (engine control module) 602 can communicate via a LIN. In some embodiments, blower 502 and an air condition ECU 603 can also communicate via a LIN. In some embodiments, door lock motor 509, wiper motor 508, exterior mirror motor 507 and BCM 511 can also communicate via a LIN. In some embodiments, seat motor 501 and seat ECU 504 can also communicate via LIN. In some embodiments, EPS 505 and ECM 602 form the power network of a CAN with a communication rate of, for example, 500 kb/s. In some embodiments, air condition ECU 603, high power DC converter 515, low power DC converter 516 and seat ECU 514 form the comfort network of a CAN with a communication rate of, for example, 125 kb/s. In some embodiments, BCM 511 and I-Key 512 form a startup network of a CAN with a communication rate of, for example, 125 kb/s.

Figure 7:
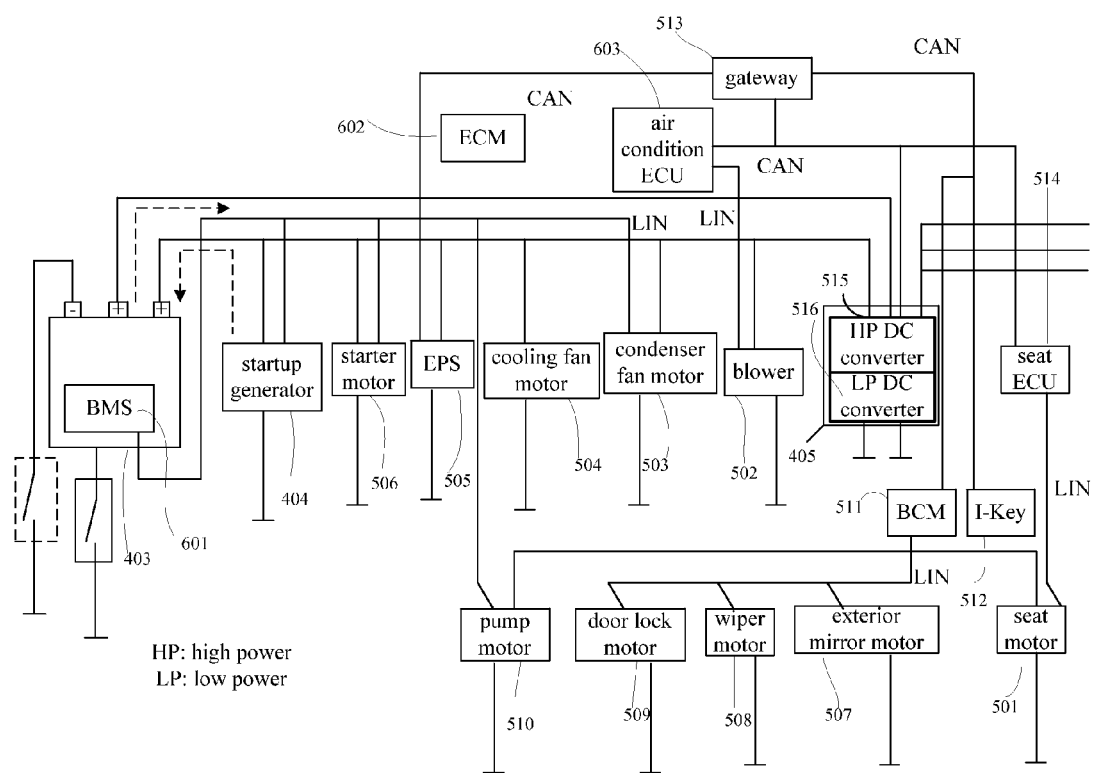
FIG. 7 illustrates an exemplary system for controlling an electric power supply to various devices and allowing those devices to communicate with each other, according to one embodiment of the present disclosure.

FIG. 7 illustrates an exemplary system for controlling an electric power supply to various devices and allowing those devices to communicate with each other, according to some embodiments of the present disclosure. In some embodiments, storage battery 403 includes a built-in BMS 601 which can be configured to control output power of storage battery 403, to shut down the storage battery 403, and to detect the electric quantity and the working state of storage battery 403. In some embodiments, storage battery 403 includes two positive output terminals for outputting a voltage of, for example, 48 V, wherein one positive output terminal outputs the first voltage (e.g. 48 V) to startup generator 404, first devices 401 and high power DC converter 515, and wherein another positive output terminal for outputting a voltage of, for example, 48 V, to low power DC converter 516. In some embodiments, converters 405 (comprising the high power DC converter 515 and the low power DC converter 516) are configured to convert the first voltage (e.g. 48 V) into the second voltage (e.g. 12 V) for second devices 402. In some embodiments, the first voltage of 48 V is converted into a high-power 12 V second voltage via high power DC converter 515, and a low-power 12 V second voltage via low power DC converter 516.

In some embodiments, low-power 12 V second voltage can be provided to a part of second devices 402 including BCM 511 and I-Key 512. In some embodiments, high power 12 V second voltage can be provided to other second devices 402 such as the gateway 513 and seat ECU 514. Devices can communicate with each other via LIN and/or CAN. With such an arrangement, the operation of the electric power can be coordinated, and the reliability and efficiency of the electric system can be improved.

With a system for controlling an electric power system according to embodiments of the present disclosure, at least one of the startup generator and the storage battery can be configured to supply power to one or more first devices with a first voltage. A converter can be configured to convert the first voltage to a second voltage for one or more second devices. Such an arrangement can simplify the configuration of the electric power system, and reliability of the electric system can be improved. Moreover, when the motor which is coupled with the startup generator is turned off, the storage battery can be configured to supply power to the second devices with the second voltage, and to stop supplying the first voltage to the first devices. Such an arrangement can reduce energy loss and conserve energy. When the electric quantity is detected to be less than the second predetermined electric quantity threshold, the storage battery can be further configured to stop supplying the second voltage to all of the second devices. If the power system is used in a vehicle, such an arrangement can not only provide a normal start for the vehicle but also conserve energy.

Figure 8:
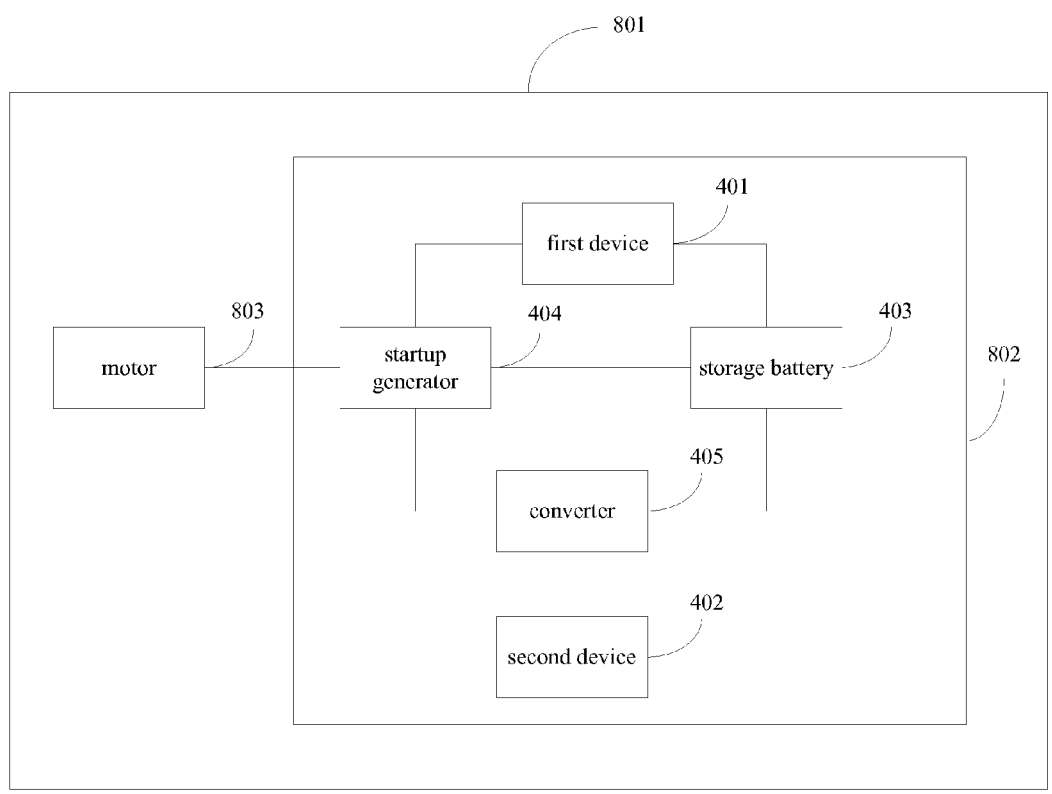
FIG. 8 illustrates an exemplary vehicle system for controlling an electric power supply to various devices in the vehicle, according to one embodiment of the present disclosure.

FIG. 8 illustrates an exemplary vehicle system for controlling an electric power supply to various devices in the vehicle, according to some embodiments of the present disclosure. As shown in FIG. 8, a vehicle system 801 comprises a system 802 for controlling the electric power supply to various devices in vehicle 801. In some embodiments, system 802 includes an electric power system described with reference to the above embodiments. In some embodiments, system 802 comprises: first devices 401, second devices 402, storage battery 403, startup generator 404, and converter 405. Storage battery 403 and startup generator 404 are configured to supply a first voltage. In some embodiments, converter 405 is configured to convert the first voltage into a second voltage. In some embodiments, the second voltage is larger than the first voltage. In some embodiments, at least one of startup generator 404 and storage battery 403 is configured to supply the first voltage to the first device, and the second voltage to the second device.

In some embodiments, vehicle system 801 further comprises a motor 803 which is coupled with startup generator 404. In some embodiments, motor 803 is configured to drive the vehicle.

In some embodiments, storage battery 403 is configured to supply the second voltage to second devices 402 and the at least one of startup generator 404 and storage battery 403 is configured to stop supplying the first voltage to first device 401 when the motor 803 is detected to be turned off, to reduce electric energy loss and to conserve energy.

In some embodiments, when motor 803 is detected to be turned off, if an electric quantity of the storage battery 403 is less than a first predetermined electric quantity threshold, motor 803 can be turned on. Motor 803 can then drive startup generator 404 to charge storage battery 403, and a part of second devices 402 stop receiving power. In some embodiments, if motor 803 remains off after attempt to turn it on fails, and if the electric quantity is less than a second predetermined electric quantity threshold, all of second devices 402 can stop receiving power. In some embodiments, the second predetermined electric quantity threshold is less than the first predetermined electric quantity threshold.

In some embodiments, first device 401 and second device 402 can communicate via a LIN and/or a CAN. In some embodiments, the LIN comprises a power network, a comfort network and a startup network, and the power network, all of which can communicate with each other via a gateway.

In some embodiments, the first voltage is substantially at 48 V and the second voltage is substantially at 12 V.

With a vehicle system according to embodiments of the present disclosure, by using a system or method for controlling a vehicle electric power system according to embodiments of the present disclosure, the fuel efficiency of the vehicle can be increased. Waste of electric energy can be reduced, and the performance of the vehicle can be improved.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The above-mentioned storage medium may be a read-only memory, a magnetic disc, an optical disc, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling an electric power supply, comprising:
    converting, a first voltage supplied by at least one of a startup generator and a storage battery of the vehicle into a second voltage;
    controlling the at least one of the startup generator and the storage battery to supply power, via at least one dc-dc converter, to a first device with the first voltage and to supply power to a second device with the second voltage;
    monitoring a state of a motor;
    after detecting that the motor is off, controlling the storage battery to supply power, via the at least one dc-dc converter, to the second device with the second voltage, and controlling the at least one of the startup generator and the storage battery to stop supplying power, via the at least one dc-dc converter, to the first device with the first voltage;
    monitoring an electric quantity of the storage battery; and
    after detecting that the electric quantity is less than a first predetermined electric quantity threshold and after detecting that the motor is off, initiating turning on the motor.

2. The method according to claim 1, wherein the first voltage is larger than the second voltage.

3. The method according to claim 1, wherein controlling the at least one of the startup generator and the storage battery is performed via a communication network.

4. The method according to claim 1, further comprising:
    after detecting that the motor is turned on after at least one attempt to turn it on, stopping supplying power to the second device with the second voltage.

5. The method according to claim 1, further comprising:
    after detecting that the motor remains off after at least one attempt to turn it on, and after detecting that the electric quantity is less than a second predetermined electric quantity threshold, stopping supplying power to the second device with the second voltage.

6. The method according to claim 5, wherein the second predetermined electric quantity threshold is at a value less than the first predetermined electric quantity threshold.

7. A system for controlling an electric power supply, comprising:
    at least one dc-dc converter;
    a startup generator and a storage battery, configured to supply a first voltage via the at least one dc-dc converter, wherein the at least one dc-dc converter is configured to convert the first voltage into a second voltage; and
    a controller configured to:
        control at least one of the startup generator and the storage battery to supply power, via the at least one dc-dc converter, to a first device with the first voltage, and to supply power, via the at least one dc-dc converter, to a second device with the second voltage;
        detect a status of a motor;
        if the motor is detected to be off, control the at least one of the startup generator and the storage battery to stop supplying power, via the at least one dc-dc converter, to the first device;
        monitor an electric quantity of the storage battery; and
        if detecting that the electric quantity of the storage battery is less than a first predetermined electric quantity threshold and if detecting that the motor is off, initiate turning on the motor.

8. The system according to claim 7, wherein the first voltage is larger than the second voltage.

9. The system according to claim 7, further comprising a communication network, wherein the storage battery is configured to supply power via the communication network.

10. The system according to claim 9, wherein the communication network comprises a power network, a comfort network and a startup network; and wherein the power network, the comfort network, and the startup network communicate via a gateway.

11. The system according to claim 7, wherein the controller is configured to stop supplying power to the second device, if the motor is detected to be on after at least one attempt to turn it on.

12. The system according to claim 7, wherein the controller is configured to stop supplying power to the second device, if the motor is detected to be off after at least one attempt to turn it on and if the electric quantity is detected to be less than a second predetermined electric quantity threshold.

13. The system according to claim 12, wherein the second predetermined electric quantity threshold is at a value less than the first predetermined electric quantity threshold.

14. A vehicle, comprising:
a motor;
at least one dc-dc converter;
a startup generator and a storage battery, configured to supply a first voltage via the at least one dc-dc converter, wherein the at least one dc-dc converter is also configured to convert the first voltage into a second voltage; and
a controller configured to:
control at least one of the startup generator and the storage battery to supply power, via the at least one dc-dc converter, to a first device with the first voltage, and to supply power, via the at least one dc-dc converter, to a second device with the second voltage;
detect a status of a motor;
if the motor is detected to be off, control the at least one of the startup generator and the storage battery to stop supplying power, via the at least one dc-dc converter, to the first device;
monitor an electric quantity of the storage battery; and
if detecting that the electric quantity of the storage battery is less than a first predetermined electric quantity threshold and if detecting that the motor is off, initiate turning on the motor.

15. The vehicle according to claim 14, wherein the first voltage is larger than the second voltage.

16. The vehicle according to claim 14, wherein the controller is configured to:
stop supplying power to the second device, if the motor is detected to be on after at least one attempt to turn it on; and
stop supplying power to the second device, if the motor is detected to be off after at least one attempt to turn it on and if the electric quantity is detected to be less than a second predetermined electric quantity threshold.

* * * * *